C. S. KELLUM.
VALVE.
APPLICATION FILED MAR. 25, 1918.
1,375,967.
Patented Apr. 26, 1921.
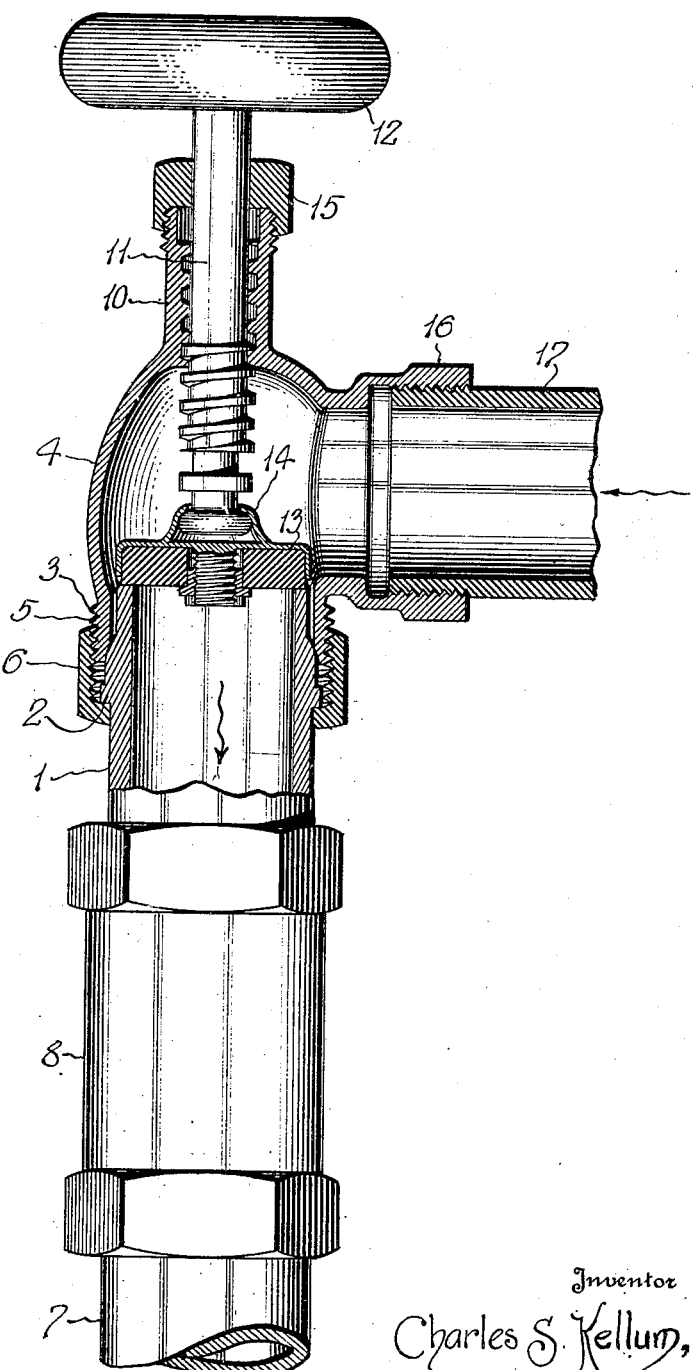
Inventor
Charles S. Kellum,
By
Attorneys

UNITED STATES PATENT OFFICE.

CHARLES S. KELLUM, OF DETROIT, MICHIGAN, ASSIGNOR TO COMMONWEALTH BRASS CORPORATION, OF DETROIT, MICHIGAN, A CORPORATION OF MICHIGAN.

VALVE.

1,375,967.  Specification of Letters Patent.  Patented Apr. 26, 1921.

Application filed March 25, 1918. Serial No. 224,658.

*To all whom it may concern:*

Be it known that I, CHARLES S. KELLUM, a citizen of the United States of America, residing at Detroit, in the county of Wayne and State of Michigan, have invented certain new and useful Improvements in Valves, of which the following is a specification, reference being had therein to the accompanying drawings.

In the construction of valves for steam lines and radiators, it is advisable to so dispose of them that they aline themselves with both the radiator nipples and with the steam line without difficulty. Especially is this true of angle valves in which the transverse disposition of the connecting nipples renders the question of alinement difficult.

This invention relates to a valve and to an arrangement thereof whereby it alines itself readily both with an intake and an outlet pipe connection, the whole being so disposed and arranged as to be ready of access and to be easily fitted without particular difficulties.

The invention consists in the matters hereinafter set forth, and more particularly pointed out in the appended claims.

The drawing is a view in elevation, partially broken away and in section, of a valve embodying features of the invention.

As herein shown, a coupling sleeve 1 is provided with an exterior flange 2 that is squarely shouldered on the outer side, and on the inner side is convexly beveled to come to seat in the corresponding annular face of a nipple 3 extending from the main casing 4 of a valve. Exterior screw threads 5 on the nipple are engaged by a suitable coupling collar 6 to connect the casing and sleeve 1 together. The outer end portion of the sleeve is screwthreaded or otherwise arranged for connection with a steam line 7 by means of the usual union 8 or the like.

A boss 10 in substantially axial alinement with the nipple 3, extends from the casing and is coarsely screwthreaded on the interior to provide for the projection and retraction of a similarly screwthreaded stem 11 with hand wheel 12. A Jenkins disk 13 is mounted as by a ball and socket connection 14 on the end of the stem 11 so as to seat against the inner end of the member 1 when forced against it. A packing gland 15 prevents leakage around the stem.

A coupling boss 16 extends at right angles to the spindle from the casing 4 and is screwthreaded or otherwise fitted for the reception of a steam feed line 17.

As will be understood the fact that the exterior of the coupling sleeve 1 extends on at least two different diameters with these diameters connected by a seating face and with the portion of less diameter sufficiently small as to be spaced from the inner wall of the casing port or nipple, provides an arrangement which permits the variations from a true right angular relation to be compensated and at the same time provides for a closed joint between such seating face and the interior of the nipple. This results from the fact that while the coupling sleeve is of a considerable length and has a portion which projects into the interior of the casing—the inner end of the sleeve, in the present embodiment, forming the valve seat—the actual contact between the sleeve and the interior of the casing walls is confined to a comparatively small surface, and this surface contact will be provided even though the sleeve has its axis slightly varied from the axis of the port with respect to the alining of the two axes, the inserted portion of the sleeve being capable of being more or less canted within the casing without affecting the joint or the valve seating action especially where the valve is of the type disclosed with its universal joint mount.

As a result of this construction the steam line and inlet pipe of any systems that are at right angles to each other, approximately, may be connected by the valve, the ball and socket arrangement of the disk together with the self alining connection between the sleeve 1 and the casing, permitting the valve to accommodate itself to any slight variations in the alinement of the parts without difficulty.

Obviously, changes in the details of construction may be made without departing from the spirit of my invention and I do not care to limit myself to any particular form or arrangement of parts.

What I claim is:—

1. As a means for alining the inlet and outlet ports of a valve casing with fitting connections having axes at approximately right angles and wherein the valve casing carries the valve member having an active closure face, a coupling sleeve adapted to be secured to one of the fitting connections and having its outer periphery extending on two diameters connected by a seating face, said sleeve being insertible within one of the casing ports to locate the portion of less diameter wholly within such casing and spaced from the casing wall, the inner end of the sleeve being adapted to operate as a closure seat, said seating face having a configuration to coöperate with the casing wall to form a closed joint therewith beyond the portion of less diameter, said valve member being formed to permit shifting of the closure face to compensate for variations in the relation of sleeve and casing at said seating face, and means for coupling the casing and sleeve together in such relation, the seating face and the complemental portion of the casing wall being relatively formed to permit relative movement or canting of the inserted portion within the casing.

2. As a means for alining the inlet and outlet ports of a valve casing with fitting connections having axes at approximately right angles and wherein the valve casing carries the valve member having an active closure face, a coupling sleeve adapted to be secured to one of the fitting connections and having its outer periphery extending on two diameters connected by a seating face, said sleeve being insertible within one of the casing ports to locate the portion of less diameter wholly within such casing and spaced from the casing wall, the inner end of the sleeve being adapted to operate as a closure seat, the internal side of the casing wall as such port being smooth, said seating face having a configuration to coöperate with said smooth wall to form a closed joint therewith beyond the portion of less diameter, said valve member being formed to permit shifting of the closure face to compensate for variations in the relation of sleeve and casing at said seating face, and means for coupling the casing and sleeve together in such relation, the seating face and the complemental portion of the casing wall being relatively formed to permit relative movement or canting of the inserted portion within the casing.

3. In a means for alining the inlet and outlet ports of a valve casing with fitting connections having axes at approximately right angles, and wherein the valve casing carries the valve member having an active closure face, a coupling sleeve adapted to be secured to one of the fitting connections and having its outer periphery extending on two diameters connected by a seating face, said sleeve being insertible within one of the casing ports to locate the portion of less diameter wholly within such casing and spaced from the casing wall, the inner end of the sleeve being adapted to operate as a closure seat, the casing wall at such port being externally threaded and internally smooth, said seating face having a configuration to coöperate with said smooth wall portion to form a closed joint therewith beyond the portion of less diameter, said valve member being formed to permit shifting of the closure face to compensate for variations in the relation of sleeve and casing at said seating face, and means connected to said threaded portion for coupling the casing and sleeve together in such relation, the seating face and complemental portion of the casing wall being relatively formed to permit relative movement or canting of the inserted portion within the casing.

4. As a means for alining the inlet and outlet ports of a valve casing with fitting connections having axes at approximately right angles, and wherein the valve casing carries the valve member having an active closure face, a coupling sleeve adapted to be secured to one of the fitting connections and having its outer periphery extending on two diameters connected by a seating face, said sleeve being insertible within one of the casing ports to locate the portion of less diameter wholly within such casing and spaced from the casing wall, the inner end of the sleeve being adapted to operate as a closure seat, the casing wall at such port being externally threaded and internally smooth, said seating face having a configuration to coöperate with said smooth wall portion to form a closed joint therewith beyond the portion of less diameter, said sleeve also having an annular shoulder beyond the seating face, said valve member being formed to permit shifting of the closure face to compensate for variations in the relation of sleeve and casing at said seating face, and a fitting member coöperating with said shoulder and said threads to couple the sleeve and casing together in such relation, the seating face and the complemental portion of the casing wall being relatively formed to permit relative movement or canting of the inserted portion within the casing.

In testimony whereof I affix my signature in the presence of two witnesses.

CHARLES S. KELLUM.

Witnesses:
KARL H. BUTLER,
ANNA M. DORR.